(12) United States Patent
Tang et al.

(10) Patent No.: US 8,385,555 B2
(45) Date of Patent: Feb. 26, 2013

(54) CONTENT DELIVERY WITH SEGMENTED KEY LIST

(75) Inventors: Lawrence W. Tang, San Diego, CA (US); Eric E. Berry, El Cajon, CA (US)

(73) Assignee: Combined Conditional Access Development and Support, LLC., San Diego, CA (US)

( * ) Notice: Subject to any disclaimer, the term of this patent is extended or adjusted under 35 U.S.C. 154(b) by 1090 days.

(21) Appl. No.: 12/331,633

(22) Filed: Dec. 10, 2008

(65) Prior Publication Data

US 2010/0142712 A1 Jun. 10, 2010

(51) Int. Cl.
*H04L 29/06* (2006.01)
(52) U.S. Cl. ...................................................... 380/278
(58) Field of Classification Search .................. 380/255, 380/277–279, 45; 713/150, 171
See application file for complete search history.

(56) References Cited

U.S. PATENT DOCUMENTS

| | | | |
|---|---|---|---|
| 5,091,938 A * | 2/1992 | Thompson et al. | 380/239 |
| 2001/0053226 A1 | 12/2001 | Akins | |
| 2006/0179309 A1* | 8/2006 | Cross et al. | 713/168 |
| 2006/0184796 A1 | 8/2006 | Fahrny | |
| 2008/0098212 A1 | 4/2008 | Helms | |

FOREIGN PATENT DOCUMENTS
EP 0 893 921 A1 1/1999

OTHER PUBLICATIONS

European Search Report, EP 09 17 7555, date of completion Apr. 6, 2010.

* cited by examiner

*Primary Examiner* — Gilberto Barron, Jr.
*Assistant Examiner* — David Le
(74) *Attorney, Agent, or Firm* — Banner & Witcoff Ltd.

(57) ABSTRACT

A content delivery network and method employing a Downloadable Conditional Access System ("DCAS") includes first and second personalization servers. A unit key list having unique keys is segmented into different blocks. Each block is encrypted with a separate transmission key corresponding to that block such that first and second blocks are respectively encrypted with first and second transmission keys. The encrypted blocks are communicated to the personalization servers. The first transmission key is communicated to the first personalization server without being communicated to another personalization server such that the first server can decrypt the first block using the first transmission key to access the keys of the first block. The second transmission key is communicated to the second personalization server without being communicated to another personalization server such that the second server can decrypt the second block using the second transmission key to access the keys of the second block.

18 Claims, 2 Drawing Sheets

CONTENT DELIVERY WITH SEGMENTED KEY LIST

BACKGROUND OF THE INVENTION

1. Field of the Invention

The present invention relates to cable and satellite networks having a Downloadable Conditional Access System ("DCAS") architecture.

2. Background Art

Cable and satellite television providers provide content such as video and audio over a network to subscribers. The subscribers have client devices such as set-top-boxes at their user premises which are connected to the network to receive the content. The providers typically employ some sort of conditional access when delivering content to the subscribers. The conditional access protects the content by requiring criteria to be met prior to the subscribers having access to the content.

A general conditional access approach includes the following. The provider encrypts the content with an encryption key such that the encrypted content can be decrypted using a decryption key corresponding to the encryption key. The provider then transmits the encrypted content over the network to the client devices. A client device is able to decrypt the encrypted content if the client device can determine the decryption key corresponding to the encryption key.

The provider encrypts the decryption key using a session key and transmits the encrypted decryption key over the network to the client devices. In particular, the provider transmits to the client devices an Entitlement Control Message ("ECM") which contains the encrypted decryption key. A client device can decrypt the encrypted decryption key to recover the decryption key if the client device can determine the session key.

Each client device has its own unique key and the provider is aware of the client devices and their unique keys. For each client device, the provider encrypts the session key using the unique key of the client device. The provider then transmits over the network a respective Entitlement Management Message ("EMM") to each client device. Each EMM includes an encrypted session key as encrypted with the unique key of the associated client device. As such, each client device receives an EMM specific to that client device. For instance, a first client device receives an EMM including the encrypted session key as encrypted with the unique key of the first client device. Likewise, a second client device receives a different EMM including the encrypted session key as encrypted with the unique key of the second client device.

As such, each client device can decrypt its specific EMM (i.e., decrypt the encrypted session key which has been uniquely encrypted for the client device) by using its unique key in order to recover the session key. In turn, the client device can decrypt the ECM (i.e., decrypt the encrypted decryption key) by using the session key to recover the decryption key in order to decrypt the encrypted content.

As described, each client device has its own unique key which is known by the provider. That is, each client device is "personalized".

A hardware process for personalizing a client device includes providing the unique key onto the client device at the time of its manufacture. Another hardware process for personalizing a client device includes providing the unique key onto a memory card (e.g., a CableCard) which is inserted into the client device. In either process, the provider learns the unique key of the client device during a registration process upon the client device connecting with the network of the provider.

The advent of a Downloadable Conditional Access System ("DCAS") architecture in a network renders the hardware personalization processes obsolete. A DCAS enables a provider to download conditional access software to the client devices over the network. As such, the provider is able to personalize the client devices. For instance, the provider can assign a unique key to a client device during a registration process upon the client device connecting with the network.

A network having a DCAS includes personalization servers for assigning unique keys to the client devices. Each personalization server is given an encrypted unit key list ("UKL") which contains the unique keys. Conventionally, the same encrypted UKL along with the UKL decryption key is given to the personalization servers. After decrypting the encrypted UKL, the personalization servers assign unique keys from the UKL to the respective client devices.

A problem is that a unique key is to be assigned to only one client device in order for the network to operate properly. That is, two client devices are not to be associated with the same unique key. As there are many personalization servers in the network to serve exponentially many more client devices, there can be instances where two personalization servers assign the same unique key to two client devices. Another problem is that an unauthorized user may gain access to the entire UKL by breaching a personalization server. Havoc on the network can be created in proportion to the amount of the UKL accessed.

SUMMARY OF THE INVENTION

It is an object of the present invention to provide a content delivery network having a Downloadable Conditional Access System ("DCAS") architecture with personalization servers in which each personalization server has access to its own respective portion of a unit key list ("UKL") having unique keys such that the personalization server is able to access the unique keys of its portion of the UKL to personalize client devices while being prevented from accessing the unique keys of the remaining portion of the UKL.

It is another object of the present invention to provide a content delivery network having a DCAS architecture with personalization servers in which the personalization servers are given the UKL after the UKL has been divided into UKL blocks with each UKL block being encrypted with a different transmission key such that a personalization server can decrypt a UKL block to access the unique keys of the UKL block for personalizing client devices only if the personalization server has the transmission key corresponding to the UKL block.

It is a further object of the present invention to provide a content delivery network having a DCAS architecture with personalization servers in which the personalization servers are given the UKL after the UKL has been divided into UKL blocks with each UKL block being encrypted with a different transmission key and in which the personalization servers are assigned a respective UKL block and given the transmission key of the UKL block such that each personalization server can only decrypt its UKL block to access the unique keys of its UKL block for personalizing client devices and is prevented from decrypting any other UKL block.

It is still another object of the present invention to provide a cable or satellite television network having a DCAS architecture with personalization servers in which each personalization server has access to its own respective portion of the UKL such that the personalization server is able to access the unique keys of its UKL portion to personalize client devices connected to the network while being prevented from accessing the unique keys of the remaining UKL portions.

In carrying out the above objects and other objects, the present invention provides a content delivery network having first and second personalization servers in communication with client devices over a communication network, and a controller in communication with the personalization servers. The controller (e.g., a Personalization Server Control Computer ("PSCC")) includes a unit key list ("UKL") having unique keys. The controller segments the UKL into different UKL blocks including first and second UKL blocks with each UKL block having a set of the unique keys. The controller encrypts each UKL block with a separate transmission key corresponding to that UKL block such that the first UKL block is encrypted with a first transmission key and the second UKL block is encrypted with a different second transmission key. The controller communicates the encrypted UKL blocks to the personalization servers. The controller further communicates the first transmission key to the first personalization server without communicating the first transmission key to another personalization server such that the first personalization server can decrypt the first UKL block using the first transmission key in order to access the unique keys of the first UKL block for personalizing the client devices. The controller further communicates the second transmission key to the second personalization server without communicating the second transmission key to another personalization server such that the second personalization server can decrypt the second UKL block using the second transmission key in order to access the unique keys of the second UKL block for personalizing the client devices.

Also, in carrying out the above objects and other objects, the present invention provides a content delivery method. The method includes segmenting a UKL having unique keys into different UKL blocks including first and second UKL blocks with each UKL block having a set of the plurality of unique keys. Each UKL block is encrypted with a separate transmission key corresponding to that UKL block such that the first UKL block is encrypted with a first transmission key and the second UKL block is encrypted with a different second transmission key. The encrypted UKL blocks are communicated to first and second personalization servers in communication with client devices over a communication network. Further, the first transmission key is communicated to the first personalization server without being communicated to another personalization server. As a result, the first UKL block may be decrypted at the first personalization server using the first transmission key such that the first personalization server can access the unique keys of the first UKL block for personalizing the client devices.

The method may further include communicating the second transmission key to the second personalization server without communicating the second transmission key to another personalization server. As a result, the second UKL block may be decrypted at the second personalization server using the second transmission key such that the second personalization server can access the unique keys of the second UKL block for personalizing the client devices.

The above features, and other features and advantages of the present invention as readily apparent from the following detailed descriptions thereof when taken in connection with the accompanying drawings.

DETAILED DESCRIPTION OF THE PREFERRED EMBODIMENT(S)

Figure 1:
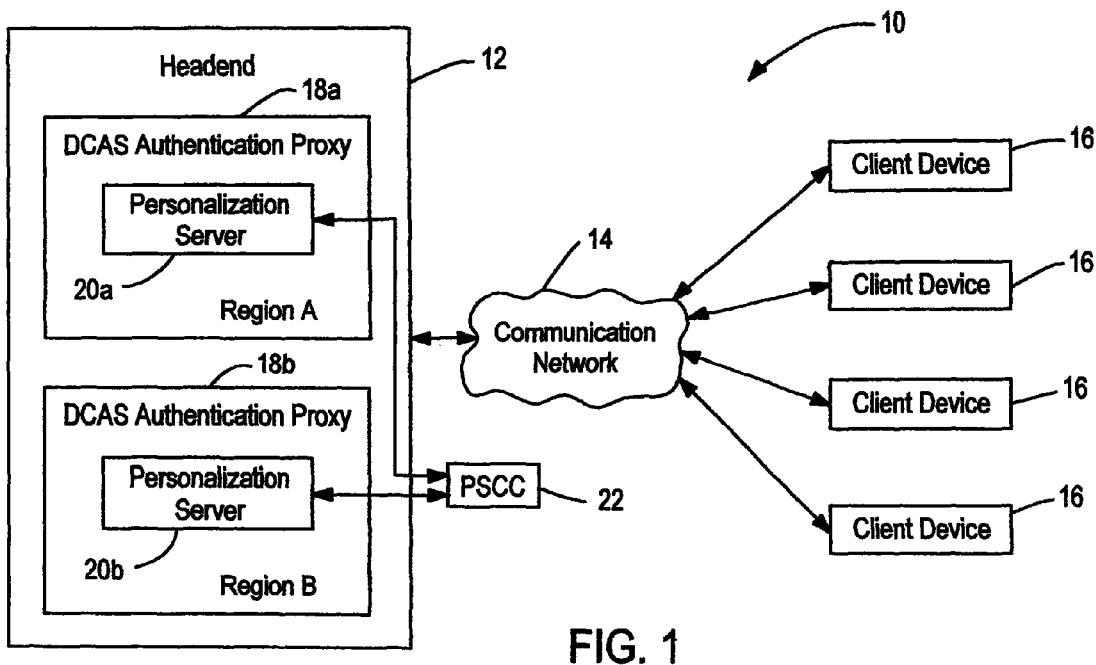
FIG. 1 illustrates a block diagram of a content delivery network having a Downloadable Conditional Access System ("DCAS") architecture in accordance with an embodiment of the present invention.

Referring now to FIG. 1, a block diagram of a content delivery network 10 having a Downloadable Conditional Access System ("DCAS") architecture in accordance with an embodiment of the present invention is shown. The content delivery network 10 includes a headend 12, a communication network 14, and client devices 16. The headend 12 and the client devices 16 are connected to the communication network 14. A provider delivers content such as video and audio from the headend 12 over the communication network 14 to the client devices 16.

In an embodiment, the provider is a television provider, the communications network 14 includes a cable network, and the television provider delivers television content from the headend 12 over the cable network 14 to the client devices 16. In another embodiment, the communications network 14 includes a satellite network, and the television provider delivers television content from the headend 12 over the satellite network 14 to the client devices 16.

In either case, the client devices 16 are associated with subscribers of the provider and are located at the user premises of their associated subscribers. Each client device 16 includes a set-top-box ("STB") or the like for outputting the content received from the headend 12 to a device such as a television.

In general, the provider encrypts the content at the headend 12 with an encryption key such that the encrypted content can only be decrypted using a decryption key corresponding to the encryption key. The provider then transmits the encrypted content from the headend 12 over the communication network 14 to the client devices 16. Each client device 16 is able to decrypt the encrypted content if the client device 16 can determine the decryption key corresponding to the encryption key. Once a client device 16 has decrypted the encrypted content to recover the content as non-encrypted therefrom, the client device 16 outputs the content to a display device for viewing by a user at the user premises.

In order for the client devices 16 to be able to determine the decryption key, the client devices 16 are to be respectively associated with unique identifiers (i.e., unique unit addresses) and unique keys and the provider is to know which unique identifiers and unique keys are associated with which client devices 16. The process for associating a unique identifier and a unique key pair with a client device 16 is known as "personalizing" the client device 16. As a result of being personalized, each client device 16 is associated with its own unique identifier (e.g., its own unique address) and a corresponding unique key with the provider knowing the association of the unique identifier and the unique key with the corresponding client device 16. For example, as a result of being personalized, a first client device 16 is associated with a first unique identifier and a first unique key and a second client device 16 is associated with a second unique identifier and a second unique key. Further, the provider knows that the first client device 16 is associated with the first unique identifier and the first unique key and that the second client device 16 is associated with the second unique identifier and the second unique key.

In the context of the present invention the personalization process may simply include only the process of associating a unique key with a client device 16. In this case, the unique identifiers of the client devices 16 are already associated with the client devices 16 and the provider knows which client devices 16 are associated with which unique identifiers prior to the provider assigning unique keys to the client devices 16 to carry out the personalization process. Further, in this case, the headend 12 and the client devices 16 are operable with one another when the client devices 16 are connected to the communication network 14 for the headend 12 to learn of the unique identifiers of the client devices 16 such that the headend 12 can communicate with the client devices 16 as a group or individually.

In general, the provider uses the unique identifier of a client device 16 to transmit messages directly from the headend 12 over the communication network 14 to that client device 16 without transmitting these messages to any other client device 16. In particular, the provider uses the unique identifier of a client device 16 to transmit from the headend 12 over the communication network 14 a message indicative of the decryption key directly to the client device 16. For instance, the provider uses the first unique identifier of the first client device 16 to transmit a message indicative of the decryption key directly to the first client device 16 such that the other client devices 16 do not receive this message. Likewise, the provider uses the second unique identifier of the second client device 16 to transmit a message indicative of the decryption key directly to the second client device 16 such that the other client devices 16 do not receive this message. Upon a client device 16 receiving a message indicative of the decryption key, the client device 16 is able to obtain the decryption key. In turn, the client device 16 uses the decryption key to decrypt the encrypted content.

Typically, client devices 16 have different levels of subscriber service. As a result, client devices 16 are to be able to decrypt or not be able to decrypt certain encrypted content based on their level of subscriber service. The level of subscriber service of a client device 16 is known by the provider from a registration or update process between the provider and the client device 16.

Because many client devices 16 are not authorized to decrypt certain encrypted content, the provider cannot simply transmit messages indicative of the decryption key to the client devices 16 without encrypting the messages. Another concern is that an unencrypted message containing the decryption key can be shared with or fraudulently learned by unauthorized users.

As such, prior to directly transmitting a message indicative of the decryption key to a client device 16, the provider uses the unique key of the client device 16 to encrypt the message. The provider then transmits the encrypted message indicative of the decryption key directly to that client device 16. For instance, the provider uses the first unique key of the first client device 16 to encrypt the message indicative of the decryption key and then transmits this first encrypted message directly to the first client device 16. Likewise, the provider uses the second unique key of the second client device 16 to encrypt the message indicative of the decryption key and then transmits this second encrypted message directly to the second client device 16.

Upon a client device 16 receiving an encrypted message indicative of the decryption key, the client device 16 uses its unique key to decrypt the encrypted message in order to obtain the decryption key. In turn, the client device 16 can use the decryption key to decrypt the encrypted content. For example, the first client device 16 uses its unique key (i.e., the first unique key) to decrypt its encrypted message (which the provider encrypted using the first unique key) in order to recover the decryption key from its encrypted message. The first client device 16 is then able to decrypt the encrypted content using the decryption key. Similarly, the second client device 16 uses its unique key (i.e., the second unique key) to decrypt its encrypted message (which the provider encrypted using the second unique key) in order to recover the decryption key from its encrypted message. The second client device 16 is then able to decrypt the encrypted content using the decryption key.

As described, the client devices 16 are to be personalized such that each client device 16 is associated with a unique identifier and a unique key and such that the provider knows which unique identifier and unique key pair corresponds to which client device 16. Further, as indicated above, the network 10 has a DCAS architecture. In general, the DCAS architecture enables the provider to download conditional access software from the headend 12 over the communication network 14 to the client devices 16. As such, the provider is able to use the DCAS architecture to personalize the client devices 16. This may be done during a registration process upon a client device 16 connecting with the communication network 14.

The DCAS architecture of the content delivery network 10 includes a first DCAS authentication proxy 18a and a second DCAS authentication proxy 18b. The authentication proxies 18 are shown in FIG. 1 as being located at the headend 12. However, the authentication proxies 18 may be separately located at different headends connected to the communications network 14. The authentication proxies 18 are operable to download conditional access software over the communication network 14 to the client devices 16.

The authentication proxies 18 respectively serve the client devices 16 located in respective regions of the content delivery network 10. For instance, the first authentication proxy 18a serves the client devices 16 located in region A of the content delivery network 10 and the second authentication proxy 18b serves the client devices 16 located in region B of the content delivery network 10. As such, the first authentication proxy 18a downloads conditional access software to the client devices 16 located in region A and the second authentication proxy 18b downloads conditional access software to the client devices 16 located in region B.

The first authentication proxy 18a includes a first personalization server 20a and the second authentication proxy 18b includes a second personalization server 20b. The first personalization server 20a is responsible for personalizing the client devices 16 located in region A and the second personalization server 20 is responsible for personalizing the client devices 16 located in region B. As such, the personalization servers 20 are responsible for assigning unique keys to the client devices 16. In particular, the first personalization server 20a is responsible for assigning unique keys to the client devices 16 located in region A and the second personalization server 20b is responsible for assigning unique keys to the client devices 16 located in region B.

The DCAS architecture of the content delivery network 10 further includes a Personalization Server Control Computer ("PSCC") 22. The PSCC 22 is in communication with the personalization servers 20 for enabling the personalization servers 20 to carry out the personalization of the client devices 16 as explained in greater detail below.

Figure 2:
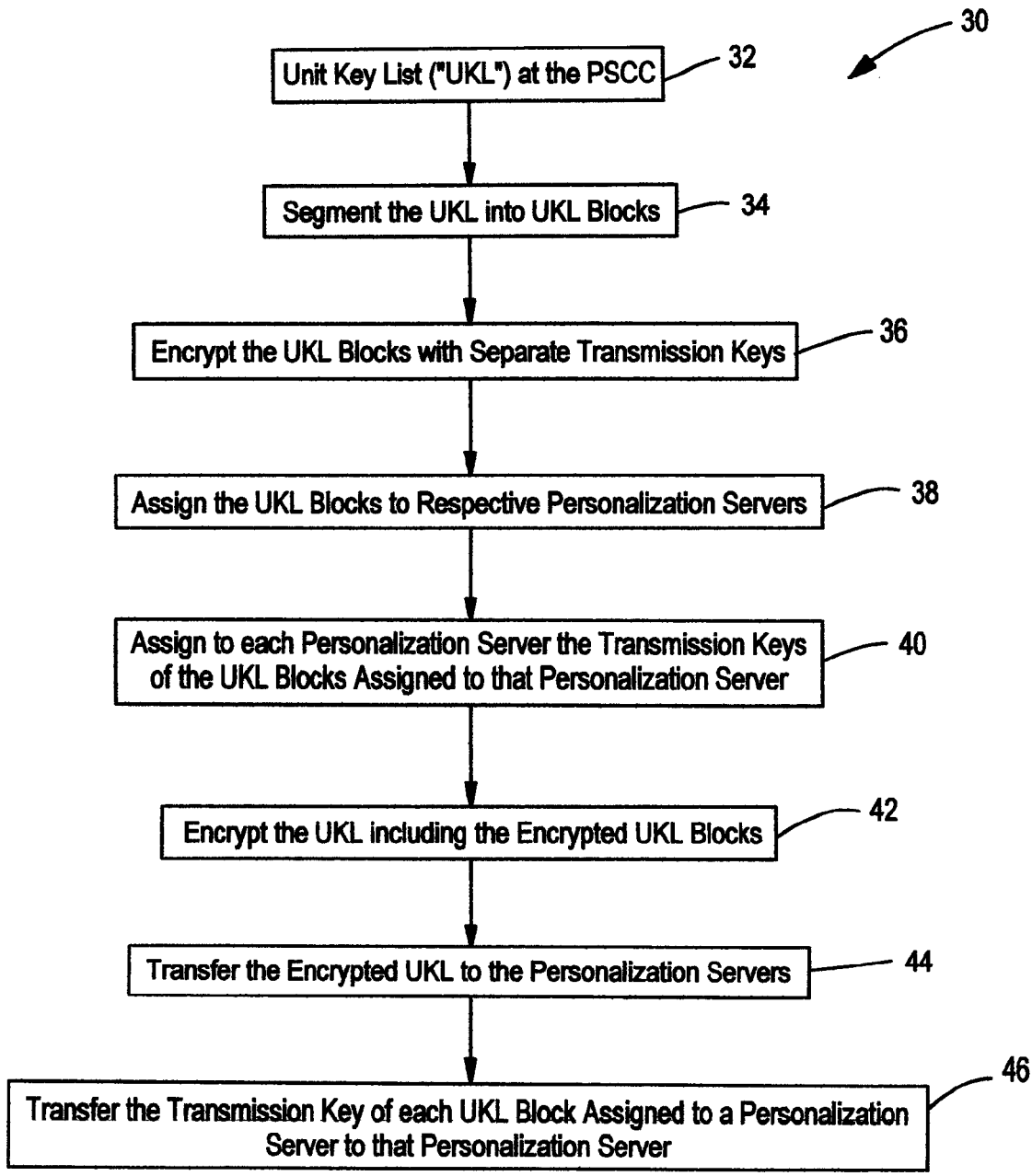
FIG. 2 illustrates a flowchart describing operation of the content delivery network for personalizing the client devices.

Referring now to FIG. 2, with continued reference to FIG. 1, a flowchart 30 describing operation of the content delivery network 10 for personalizing the client devices 16 is shown. More particularly, the flowchart 30 describes operation of the personalization servers 20 and the PSCC 22 for personalizing the client devices 16.

The operation begins with the PSCC 22 receiving or generating the unit key list ("UKL") as shown in step 32. The UKL includes a plurality of units with each unit having a unique identifier (e.g., a unique address) and a unique key. For instance, a first unit has a first unique identifier and a first unique key and a second unit has a second unique identifier and a second unique key. Each unit is to be associated by a personalization server 20 with one client device 16 in order for the personalization server 20 to personalize that client device 16. For example, the first unit may be associated by a personalization server 20 with the first client device 16 in order to personalize the first client device 16 and the second unit may be associated by a personalization server 20 with the second client device 16 in order to personalize the second client device 16.

Typically, in the case of the PSCC 22 receiving the UKL from another source, the source encrypts the UKL to ensure that the UKL is not accessible by an unauthorized user while being provided to the PSCC 22. The PSCC 22 previously registers with the source to be able to decrypt the encrypted UKL. As such, after receiving the encrypted UKL, the PSCC 22 decrypts the encrypted UKL to recover the (non-encrypted) UKL.

The PSCC 22 divides the UKL into separate UKL blocks as shown in step 34. For instance, the PSCC 22 divides the UKL into UKL blocks each having roughly 32 k units. As can be appreciated, the UKL includes many thousands of units such that the UKL can be divided into a set of UKL blocks each having roughly 32 k units. Each UKL block includes its own separate group of units. For example, a first UKL block includes the units #1 to #32,000, a second UKL block includes the units #32,001 to #64,000, and so on.

The PSCC 22 encrypts the UKL blocks with separate transmission keys as shown in step 36. That is, each UKL block is encrypted with a different transmission key. For example, the PSCC 22 encrypts first UKL block with a first transmission key, the second UKL block with a second transmission key, and so on. As a result, the transmission key for an encrypted UKL block is required in order to decrypt the encrypted UKL block to recover the (non-encrypted) UKL block. For instance, the first encrypted UKL block can be decrypted using the first transmission key to recover the first (non-encrypted) UKL block and the second encrypted UKL block can be decrypted using the second transmission key to recover the second (non-encrypted) UKL block.

After the PSCC 22 divides the UKL into the encrypted UKL blocks, the PSCC 22 assigns the UKL blocks to respective ones of the personalization servers 20 as shown in step 38. In particular, the PSCC 22 assigns each UKL block to only one personalization server 20. For example, the PSCC 22 assigns the first UKL block to the first personalization server 20a and does not assign the first UKL block to any other personalization server 20. Likewise, the PSCC 22 assigns the second UKL block to the second personalization server 20b and does not assign the second UKL block to any other personalization server 20. The PSCC 22 may assign more than one UKL block to a personalization server 20. However, again, any of the UKL blocks assigned to a personalization server 20 are not assigned any other personalization server 20.

In this way, each personalization server 20 is assigned at least one UKL block which is not assigned to any other personalization server 20.

The operation of steps 36 and 38 may be interchanged. In either event, after the operations of steps 36 and 38 have been completed, the UKL has been divided into a set of encrypted UKL blocks with each personalization server 20 being individually assigned their own encrypted UKL block(s).

The PSCC 22 assigns to the personalization servers 20 the transmission keys of the UKL blocks assigned to the personalization servers 20 as shown in step 40. For instance, assuming the first UKL block has been assigned to the first personalization server 20a and the second UKL block has been assigned to the second personalization server 20b, the PSCC 22 assigns the first transmission key to the first personalization server 20a and assigns the second transmission key to the second personalization server 20b.

The PSCC 22 encrypts the UKL including the encrypted UKL blocks with a UKL encryption key as shown in step 42. As such, the output of step 42 is the encrypted UKL which includes (a) the UKL which has been encrypted as a whole with the UKL encryption key and (b) the encrypted UKL blocks which have been respectively encrypted with their associated transmission keys. Thus, decrypting the encrypted UKL with a UKL decryption key corresponding to the UKL encryption key results in the encrypted UKL blocks. Therefore, even if the UKL decryption key is known by an unauthorized user having access to the encrypted UKL, access to any encrypted UKL block is prevented as long as its associated transmission key is unknown to the unauthorized user.

The PSCC 22 transfers the encrypted UKL (which includes all of the encrypted UKL blocks) to the personalization servers 20 as shown in step 44. As such, each personalization server 20 has the encrypted UKL. The personalization servers 20 previously register with the PSCC 22 to learn of the UKL decryption key for decrypting the encrypted UKL. As such, each personalization server 20 can decrypt the encrypted UKL. However, again, the output of decrypting the encrypted UKL results in the encrypted UKL blocks. As described above, no personalization server 20 can decrypt an encrypted UKL block unless the personalization server 20 has the transmission key for that encrypted UKL block.

The PSCC 22 transfers the transmission key of the UKL block assigned to each personalization server 20 to that personalization server 20 as shown in step 46. For instance, assuming that the first UKL block is assigned to the first personalization server 20a and the second UKL block is assigned to the second personalization server 20b, the PSCC 22 transfers the first transmission key to the first personalization server 20a and transfers the second transmission key to the second personalization server 20b. As the first UKL block is assigned only to the first personalization server 20a, the PSCC 22 transfers the first transmission key only to the first personalization server 20a. Likewise, as the second UKL block is assigned only to the second personalization server 20b, the PSCC 22 transfers the second transmission key only to the second personalization server 20b.

Accordingly, only the first personalization server 20a can use the first transmission key to decrypt the first encrypted UKL block (which the PSCC 22 has encrypted using the first transmission key). Similarly, only the second personalization server 20b can use the second transmission key to decrypt the second encrypted UKL block (which the PSCC 22 has encrypted using the second transmission key).

Once a personalization server 20 has decrypted its encrypted UKL block, the personalization server 20 can access the units (i.e., the pairs of unique identifiers and unique keys) in order to personalize the client devices 16. That is, a personalization server 20 can assign the unique identifier and unique key pairs of its UKL block to the client devices 16 which are the responsibility of the personalization server 20 in order to personalize these client devices 16.

As indicated above, in the context of the present invention, the UKL may simply include only the unique keys. As such, the personalization process may simply include only the process of associating a unique key with a client device 16. In this case, the unique identifiers of the client devices 16 are already associated with the client devices 16 and the personalization servers 20 (or the headend 12 in general) knows which client devices 16 are associated with which unique identifiers prior to the personalization servers 20 assigning unique keys to the client devices 16 to carry out the personalization process. As such, in this case, the steps of the operation shown in flowchart 30 are carried out with the end result being that each personalization server 20 is assigned its own encrypted UKL block along with the associated transmission key in order for that personalization server 20 to be able to assign unique keys from its UKL block to the client devices 16.

Figure 3:
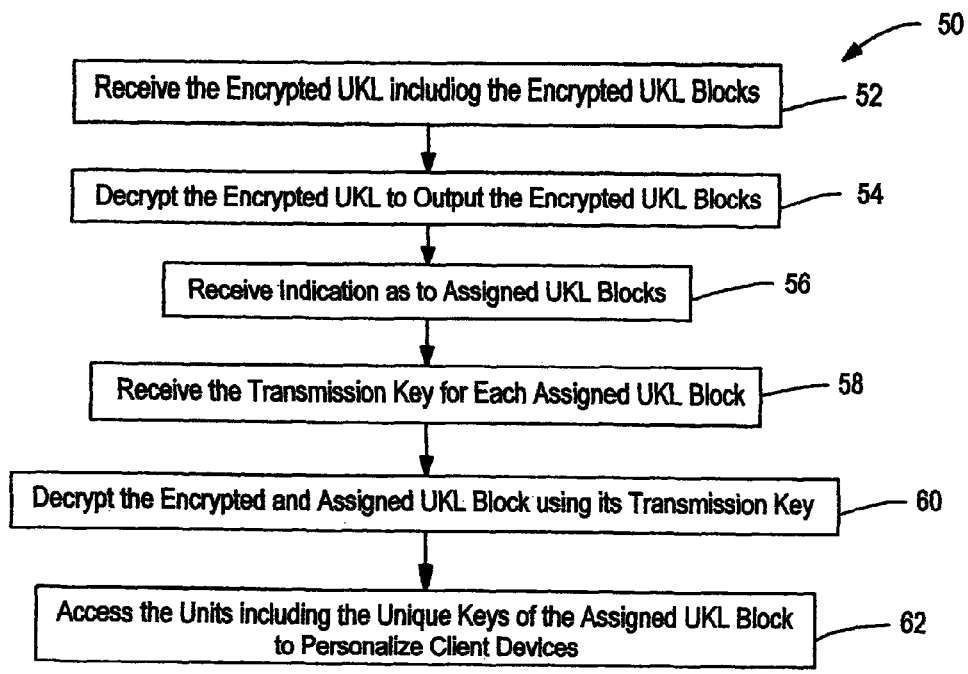
FIG. 3 illustrates another flowchart describing operation of the content delivery network for personalizing the client devices.

Referring now to FIG. 3, with continual reference to FIGS. 1 and 2, another flowchart 50 describing operation of the content delivery network 10 for personalizing the client devices 16 is shown. The operation shown in flowchart 50 is from the perspective of a personalization server 20. It is noted that the operation shown in flowchart 50 is experienced by each personalization server 20.

Initially, as described above, the personalization server 20 receives the encrypted UKL which includes the encrypted UKL blocks from the PSCC 22 as shown in step 52. The encrypted UKL has been encrypted with a UKL encryption key and the encrypted UKL blocks contained therein have been separately encrypted with their own transmission keys as described above. Further, the personalization server 20 has, or receives with the encrypted UKL, the UKL decryption key for decrypting the encrypted UKL.

The personalization server 20 uses the UKL decryption key to decrypt the encrypted UKL to output the encrypted UKL blocks as shown in step 54.

The personalization server 20 receives an indication from the PSCC 22 as to which UKL block is assigned to the personalization server 20 as shown in step 56. For instance, the personalization server 20 receives a range of units of the UKL which are to be assigned to the personalization server 20. In this way, the personalization server 20 can determine which UKL block is assigned to the personalization server 20.

Furthermore, a subsequent indication may happen some time after the personalization server 20 has been in service. For instance, if the personalization server 20 should happen to exhaust the units of a UKL block assigned to the personalization server 20 while personalizing the client devices 16, the PSCC 22 may assign another (unused) UKL block to the personalization server 20.

The personalization server 20 receives from the PSCC 22 the transmission key corresponding to the UKL block assigned to the personalization server 20 as shown in step 58. As such, after steps 56 and 58, the personalization server 20 knows which UKL block is assigned to it and also knows the transmission key for the assigned UKL block. As described above, none of the other personalization servers 20 receives the transmission key for the UKL block assigned to the personalization server 20.

The personalization server 20 decrypts its assigned UKL block (which is still in encrypted form at this point in time) using the transmission key for the assigned UKL block as shown in step 60. The output of this step is the assigned (non-encrypted) UKL block. As such, the personalization server 20 has access to the units of the assigned UKL block.

The personalization server 20 accesses the units of the assigned UKL block to personalize the client devices as shown in step 62. For instance, in the case of the units only including unique keys, the personalization server 20 individually assigns the unique keys to the client devices 16 in order to personalize the client devices 16 as described above. Similarly, in the case of the units including unique identifier and key pairs, the personalization server 20 individually assigns the unique identifier and key pairs to the client devices 16 in order to personalize the client devices 16 as described above.

Accordingly, the operation of the content delivery network 10 prevents two or more personalization servers 20 from assigning the same unique key to two or more client devices 16. Furthermore, an unauthorized user gaining access via a personalization server 20 to the encrypted UKL blocks and the transmission key(s) of the UKL blocks assigned to that personalization server 20 will only be able to access the UKL blocks assigned to that personalization server 20. As such, the unauthorized user is prevented from gaining access to the entire UKL block. In this way, assuming that all of the UKL blocks have been assigned to the personalization servers 20, the unauthorized user would have to access each personalization server 20 and all of the transmission keys in order to gain access to the entire UKL block.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A content delivery network comprising:
a controller in communication with a plurality of personalization servers and storing a unit key list ("UKL") having a plurality of unique keys, the controller configured to: segment the UKL into different UKL blocks including first and second UKL blocks with each UKL block having a set of the plurality of unique keys, encrypt the first UKL block with a first transmission key associated with a first personalization server and the second UKL block is encrypted with a different second transmission key associated with a second personalization server, and communicate the UKL with the first and second encrypted UKL blocks to each of the personalization servers.

2. The content delivery network of claim 1 wherein:
the controller is further configured to communicate the first transmission key to the
first personalization server and not communicate the first transmission key to any other personalization servers;
the controller further configured to communicate the second transmission key to the second personalization server and not communicate the second transmission key to any other personalization servers.

3. The content delivery network of claim 2 wherein:
the first personalization server is configured to decrypt the first UKL block using the first transmission key in order to access the unique identifiers and unique keys of the first UKL block for personalizing client devices; and
the second personalization server is configured to decrypt the second UKL block using the second transmission key in order to access the unique keys of the second UKL block for personalizing client devices.

4. The content delivery network of claim 1 wherein: the controller is configured to encrypt the encrypted UKL blocks as a group with a UKL encryption key.

5. The network of claim 1 wherein:
the different UKL blocks further include a third UKL block which the controller is configured to encrypt with a third transmission key;
wherein, in response to a request from the first personalization server indicating that the server requires more unit keys due to an addition of client devices, the controller is configured to communicate the third transmission key to the first personalization server and not communicate the third transmission key to any other of the personalization servers such that the first personalization server can decrypt the third UKL block using the third transmission key in order to access the unique keys of the third UKL block for personalizing client devices.

6. The content delivery network of claim 2 wherein:
the first personalization server is configured to personalize a first set of client devices and the second personalization server is configured to personalize a different second set of client devices.

7. The content delivery network of claim 6 wherein: the client devices are set-top-boxes.

8. The content delivery network of claim 6 wherein:
each personalization server is part of a headend in communication with the client devices over the communication network.

9. A content delivery method comprising:
segmenting a unit key list ("UKL") having a plurality of unique keys into different UKL blocks including first and second UKL blocks with each UKL block having a set of the plurality of unique keys;
encrypting each UKL block with a separate transmission key corresponding to that UKL block such that the first UKL block is encrypted with a first transmission key and the second UKL block is encrypted with a different second transmission key;
communicating the encrypted UKL blocks to first and second personalization servers in communication with client devices over a communication network; and
communicating the first transmission key to the first personalization server without communicating the first transmission key to the second personalization server.

10. The content delivery method of claim 9 further comprising:
decrypting the first UKL block at the first personalization server using the first transmission key such that the first personalization server can access the unique keys of the first UKL block for personalizing the client devices.

11. The content delivery method of claim 10 further comprising:
communicating the second transmission key to the second personalization server without communicating the second transmission key to the first personalization server; and
decrypting the second UKL block at the second personalization server using the second transmission key such that the second personalization server can access the unique keys of the second UKL block for personalizing the client devices.

12. The content delivery method of claim 11 further comprising:
encrypting the encrypted UKL blocks as a group with a UKL encryption key; and
wherein communicating the encrypted UKL blocks to the personalization servers includes communicating the encrypted UKL blocks encrypted as a group to the personalization servers.

13. The content delivery method of claim 10 wherein:
the UKL includes a plurality of unique identifiers which correspond to the unique keys;
wherein decrypting the first UKL block at the first personalization server includes accessing the unique identifiers.

14. The content delivery method of claim 9 wherein: the different UKL blocks further include a third UKL block and encrypting each UKL block with a separate transmission key corresponding to that UKL block includes encrypting the third UKL block with a third transmission key; the method further comprising communicating the third transmission key to the first personalization server without communicating the third transmission key to the second personalization server in response to a request from the first personalization server.

15. The content delivery method of claim 9, further comprising the first and second personalization servers using their respective UKL blocks to personalize client set-top boxes.

16. The content delivery method of claim 9 wherein:
each personalization server is part of a headend in communication with the client devices over the communication network.

17. A non-transitory computer-readable medium, storing instructions that, when executed by a processor, cause the following to occur:
communicating with a plurality of personalization servers and storing a unit key list ("UKL") having a plurality of unique keys;
segmenting the UKL into different UKL blocks including first and second UKL blocks with each UKL block having a set of the plurality of unique keys;
encrypt the first UKL block with a first transmission key of a first personalization server;
encrypt the second UKL block with a second transmission key of a second personalization server, the transmission key of the second personalization server being different from the transmission key of the first personalization server; and
communicating the UKL having both the first and second encrypted UKL blocks to each of the personalization servers.

18. The computer-readable medium of claim 17, wherein the first and second transmission keys are uniquely assigned to the first and second personalization servers, respectively.

* * * * *